3,325,406
COPOLYMERS OF ISOBUTENE AND ACROLEIN ETHYLENE DITHIOACETAL
Cecil G. Brannen, Highland, and James A. Wuellner, Gary, Ind., assignors to Standard Oil Company, Chicago, Ill., a corporation of Indiana
No Drawing. Filed Dec. 28, 1964, Ser. No. 421,673
7 Claims. (Cl. 252—32.7)

This invention relates to novel polymers of isobutene. More particularly it relates to sulfur-containing isobutene polymers which are highly resistant to acid hydrolysis, their preparation, and to lubricant composition containing same.

It is well known that copolymers produced by conventional polymerization techniques containing monomeric units which alternate regularly or at random in the copolymer chain. The properties of the copolymer will depend upon the particular monomers employed, and the relative concentrations of each monomer in the copolymer product. Thus, by judiciously selecting the monomers to be copolymerized, and by controlling their relative concentrations, copolymers having specific useful properties may be tailor-made to fit the needs of industry. In particular, copolymeric compositions useful as lubricants and lubricant additives may be manufactured.

Lubricating oils perform more effectively when chemical additives are combined with the lubricating oil. Among the more important properties of a lubricant ameliorated by additives, such as polymers and copolymers, is the viscosity index. An improved viscosity index results in a more uniform viscosity at the varying temperatures to which a lubricant is often subjected during use. Thus, a particularly advantageous means of improving the viscosity index of a lubricant is by adding to a base lubricant an oil-soluble polymer, such as the polymeric compositions of the present invention.

In recent years, lubricant manufacturers have directed their efforts toward multi-purpose lubricant compositions. A composition which performs multi-functions, such as improving the viscosity index, imparting detergency and dispersancy characteristics, and rust inhibition, reduces the number of additives required in a lubricant, and often proportionately reduces the cost without sacrificing quality.

The novel polymers of this invention consist essentially of units A having the formula

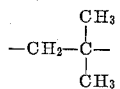

and units B having the formula

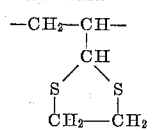

wherein the molar ratio of $A:B$ is from 1–100:1, preferably 5–50:1, said units A and B being randomly distributed in the polymer chain. These novel polymers, ranging from liquids to rubbery solids, having a molecular weight of at least 1000, preferably 5000 to 200,000, are effective multifunctional additives for lubricants. Improvement in the viscosity index, detergency and dispersancy characteristics of lubricating oils is obtained by the addition of the novel polymers of this invention to such oils in amounts ranging from about 0.1 to about 20, preferably about 1–10, weight percent. The polymers are also effective as extreme pressure agents in liquid and solid lubricants.

The polymers of this invention can be prepared by copolymerizing monomer (A) isobutene and copolymerizable monomer (B) acrolein ethylene-dithioacetal (or 2-vinyl-1,3-dithiacyclopentane), in a molar ratio of $A:B$ from 1–100:1, in the presence of a Lewis acid catalyst such as $BF_3$, $BF_3$ etherate, aluminum chloride, and titanium chloride, at temperature from about 0 to $-100°$ F. The structural formula for monomer B is

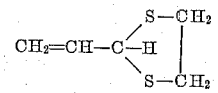

Thus, units A and B in the polymer of this invention correspond to the polymerized units of monomers A and B herein set forth. Monomer B can be prepared by reacting acrolein and ethane dithiol ($HS—CH_2CH_2—SH$) under slightly basic conditions at temperatures in the range of 15–100° C.

An alternate technique for preparing the polymers of this invention comprises reacting ethane dithol and the hydrolyzed copolymer consisting essentially of copolymerized monomers (C) isobutene and (D) acrolein diethyl diacetal in a molar ratio of $C:D$ of 1–100:1, under slightly basic conditions, at temperatures of from about 15 to about 100° C. Said hydrolyzed copolymer prepared by copolymerizing monomers (C) isobutene and (D) acrolein diethyl diacetal [$CH_2=CH—CH(OC_2H_5)_2$] in the presence of a Lewis acid catalyst at temperatures in the range of $-100$ to 0° F. in a molar ratio of 1–100:1, preferably in an inert solvent. After removal of unreacted monomers and solvent, the copolymer is then hydrolyzed with aqueous acid at moderate temperatures of from about 15 to about 100° C. to form the hydrolyzed copolymer for subsequent reaction with ethane dithiol.

The ratio of isobutene (2-methylpropene), commonly referred to as isobutylene, monomer to acetal or dithioacetal co-monomer is of particular importance to the invention. Thus, for the polymer per se to be utilized as a lubricant, it is desirable that the ratio of isobutene monomer to co-monomer be high, preferably from about 5 to about 50:1. When using the polymer product of this invention as a lubricant additive, the ratio of isobutene monomers to co-monomers must be sufficiently high to produce an oil-soluble polymer composition. A polymer having about 25–50 polymerized isobutene units for each polymerized B unit is preferred as a lubricant additive.

Polymerization techniques for polymerizing isobutene monomer and acetal or dithioacetal monomers are known in the art. Cationic polymerization techniques employing a Lewis acid are preferred. Ziegler-type catalysts may also be advantageously employed. Typical Lewis acid catalysts suitable for copolymerizing copolymers of the present invention are $BF_3$, $BF_3$ etherate, aluminum chloride, and titanium chloride. An example of a suitable Ziegler catalyst is trialkyl aluminum and titanium chloride. From about 1 to 20 weight percent of the catalyst may suitably be used in polymerization.

Polymerization may be effected in bulk or solution, and the preferred method is solution polymerization. A typical solvent is heptane; however, most inert hydrocarbon solvents are suitable. A useful expedient is to employ a base lubricating oil as a solvent. Subsequent separation of the copolymer product from a solvent, which would be incompatible with the base oil, is thus avoided.

Polymerization may be carried out at temperatures from about $-100°$ F. to about 0° F. The molecular weight of the copolymer product is influenced by the polymerization temperature. Thus, the most advantageous polymerization temperature within the range will depend upon the desired molecular weight of the final product.

A preferred temperature range for producing copolymers suitable for use as lubricant additives is about −50° F. to about −20° F. Polymerization may be accomplished at atmospheric, sub-atmospheric or super-atmospheric pressures. The pressure at which polymerization is carried out is not critical and persons familiar with cationic polymerization techniques will know the desirable pressures for effecting polymerization.

After polymerization has been carried out for a time sufficient to copolymerize the isobutene monomers and desired co-monomers, the copolymer product may be separated from the reaction mixture and purified in the following manner. The reaction mixture is admixed with methanol, ethanol, propanol, or another non-solvent, and the copolymer is collected. The copolymer is then re-dissolved in hexane or an appropriated solvent and again precipitated with methanol. The resulting composition is a polymer having a molecular weight from about 1000 to about 200,000 or higher, depending largely on the polymerization temperature and the ratio of isobutene to co-monomer. Preferred polymers will have a molecular weight from about 60,000 to about 70,000.

A distinctly novel feature of the polymers of the present invention is the pendant cyclic sulfur-containing groups extending from the hydrocarbon backbone of the polymer. These groups are highly resistant to hydrolysis and impart multi-functional properties to the viscosity index improving polymer of the invention.

The utility of the polymers of the present invention is illustrated through the polymer's use in a mineral lubricating oil to improve its viscosity index. However, the base oil to which the polymer may be added is not limited to a mineral oil; synthetic and natural lubricating oils may also be employed as base lubricants.

The addition of about 2 weight percent of a polymer having a molar ratio of units $A:B$ of about 25:1 and a molecular weight of from about 60,000 to about 70,000 to a 50/50 blend of solvent extracted SAE 5 and SAE 10 grade mineral lubricating oil base stocks will produce a SAE 10W–30 grade motor oil base stock suitable for the preparation of compounded motor oils. The addition of about 6 weight percent of a barium-containing polybutene-$P_2S_5$ reaction product, about 1 weight percent of zinc dialkyldithiophosphate, and 1 weight percent of calcium petroleum sulfonate to the aforesaid 10W–30 mineral oil base stock forms a satisfactory SAE 10W–30 grade crankcase motor oil.

We claim:
1. The polymer consisting essentially of units (A) having the formula

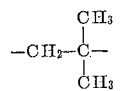

and units (B) having the formula

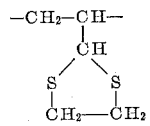

wherein the molar ratio of $A:B$ is from 1–100:1, said polymer having a molecular weight of from about 1000 to about 200,000.

2. The polymer of claim 1 wherein the molar ratio of $A:B$ is from 5–50:1.

3. A lubricating oil containing a minor amount, sufficient to improve the viscosity index of said oil, of an oil-soluble polymer of claim 1.

4. The lubricating oil of claim 3 wherein the amount of said polymer is from 0.1 to about 20 weight percent.

5. A mineral lubricating oil containing a minor amount, sufficient to improve the viscosity index of said oil, of the polymer of claim 2 having a molecular weight from about 2,000 to about 200,000.

6. The lubricating oil of claim 5 wherein the amount of said polymer is about 2 weight percent, said polymer having a molar ratio of $A:B$ of 25:1, and a molecular weight of from about 60,000 to about 70,000.

7. The composition of claim 6 further including about 6 weight percent barium-containing $P_2S_5$-polybutene reaction product; about 1 weight percent dialkyldithiophosphate; and about 1 weight percent calcium petroleum sulfonate.

References Cited

UNITED STATES PATENTS 3,010,923    11/1961    Ikeda _____ 260—79.7

OTHER REFERENCES

Organic Chemistry, Fieser and Fieser, 2nd ed., D. C. Heath and Company, Boston, pp. 216 and 217.

DANIEL E. WYMAN, *Primary Examiner.*

L. G. XIARHOS, *Assistant Examiner.*